United States Patent
Delzanno et al.

(10) Patent No.: US 6,672,301 B2
(45) Date of Patent: Jan. 6, 2004

(54) APPARATUS FOR KEEPING HOT AND FOR TRANSPORTING DISHES USING A MOTOR VEHICLE

(76) Inventors: Roberto Delzanno, via Boschina 17, CH-6953, Pregassona (CH); Lorenzo Delzanno, via Boschina 17, CH-6953, Pregassona (CH)

( * ) Notice: Subject to any disclaimer, the term of this patent is extended or adjusted under 35 U.S.C. 154(b) by 0 days.

(21) Appl. No.: 10/242,599

(22) Filed: Sep. 13, 2002

(65) Prior Publication Data
US 2003/0052499 A1 Mar. 20, 2003

(30) Foreign Application Priority Data
Sep. 14, 2001 (CH) .................................. 1698/01

(51) Int. Cl.⁷ .............................. F24B 1/00; A47J 47/14
(52) U.S. Cl. .................. 126/19.5; 126/273 R; 126/276; 126/268; 99/476
(58) Field of Search ................................ 126/19.5, 268, 126/273 R, 273.5, 275 R, 275 E, 276, 19 R; 99/476, 475; 219/387, 386, 399; 296/22

(56) References Cited

U.S. PATENT DOCUMENTS

| | | | |
|---|---|---|---|
| 2,168,491 A | * | 8/1939 | Parmeter .................... 126/19.5 |
| 3,809,059 A | * | 5/1974 | Burk et al. ................. 126/19.5 |
| 3,874,361 A | * | 4/1975 | Parrinello ................... 126/19.5 |
| 5,505,122 A | * | 4/1996 | Gerrit ........................... 99/476 |
| 5,582,095 A | * | 12/1996 | Rial ............................. 99/483 |

FOREIGN PATENT DOCUMENTS

| | | |
|---|---|---|
| CH | 1264/99 | 7/1999 |
| EP | 0481352 | 4/1992 |
| EP | 0575471 | 12/1993 |
| EP | 0628277 | 12/1994 |
| GB | 2316739 | 3/1998 |
| WO | 92/16137 | 10/1992 |

* cited by examiner

Primary Examiner—James C. Yeung
(74) Attorney, Agent, or Firm—Greenblum & Bernstein, P.L.C.

(57) ABSTRACT

Apparatus for keeping hot and for transporting prepared dishes, in particular pizzas, from the producer to the consumer, using a motor vehicle equipped with a thermally insulated container, which in its lower portion is provided with a heat exchanger using which the heat supplied by an external source is transmitted to the air in the container by heat conduction and radiation, characterised in that the container is laid out as an essentially square box at the bottom of which the heat exchanger is incorporated. One of the four lateral walls of the box is linked to the box, forming a door which is sealed and gives access to the container. The other three lateral walls and the top cover of the box are laid out as double walls enclosing air interspaces, which on their sides are all mutually interconnected and towards the front, towards the access door, are connected to the inner chamber of the container. The inner chamber of the container is connected with the surrounding room via a through passage opening located in the lower portion of the bottom of the container. Air from the outside is fed into the air interspaces provided in the other lateral walls and in the top cover using at least one blowing fan arranged in the back lateral wall in such a manner that an air stream is established passing from the air interspaces to the inner chamber via the connection provided at the access door and escaping via the passage opening located at the bottom of the container. The inner chamber, in which the dishes to be transported are stored, is provided with supporting shelves which do not subdivide it into separated zones but permit free air circulation and formation of air vortices.

26 Claims, 2 Drawing Sheets

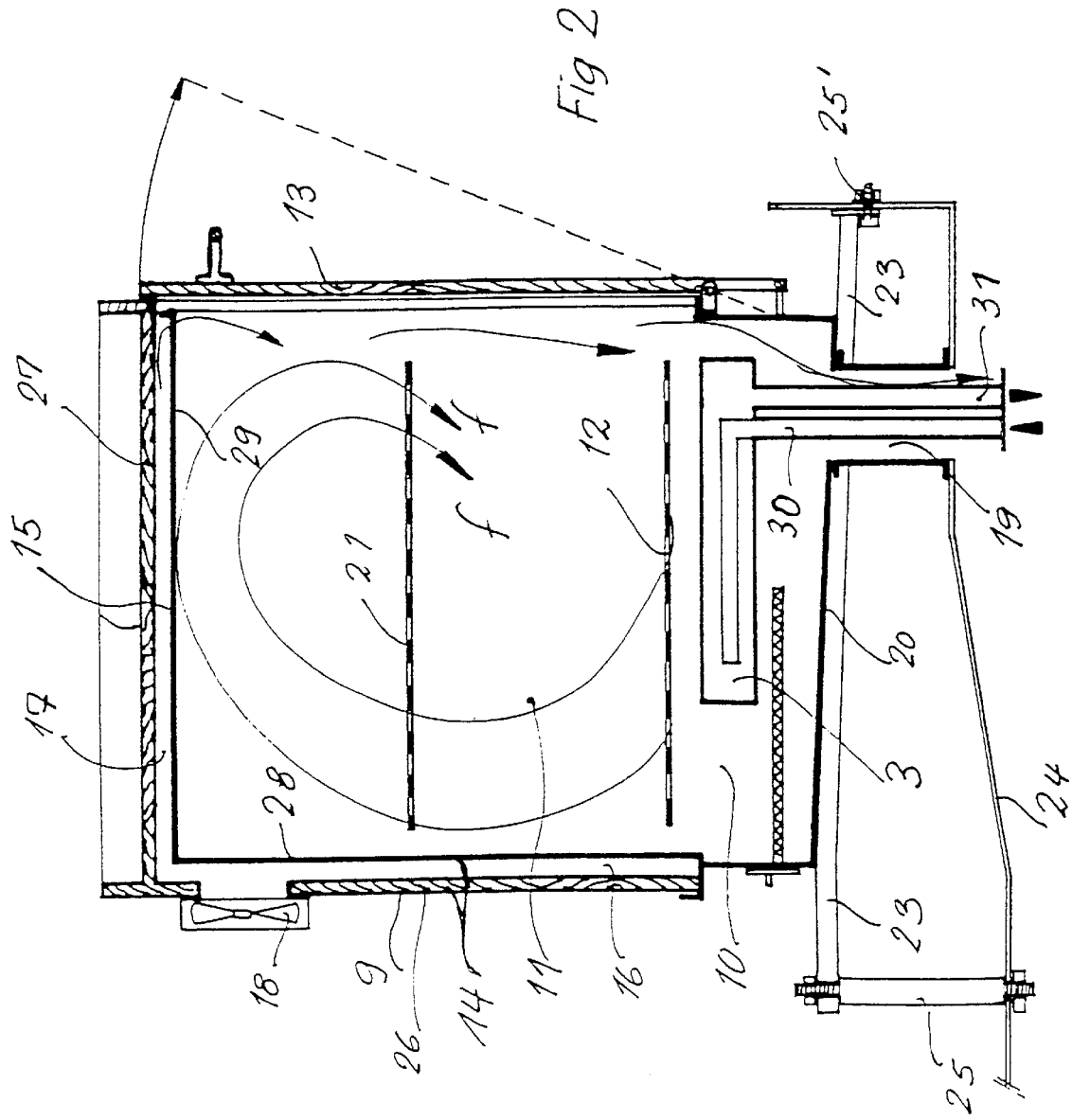

APPARATUS FOR KEEPING HOT AND FOR TRANSPORTING DISHES USING A MOTOR VEHICLE

CROSS-REFERENCE TO RELATED APPLICATION

The present application claims priority under 35 U.S.C. §119 of Swiss Patent Application No.2001 1698/01, filed on Sep. 14, 2001, the disclosure of which is expressly incorporated by reference in its entirety.

BACKGROUND OF THE INVENTION

1. Field of the Invention

The present invention concerns an apparatus for keeping hot and for transporting dishes, in particular pizzas, from a producer to a consumer using a motor vehicle.

2. Discussion of Background Information

Transport of prepared dishes, and in particular of pizzas, using a motor vehicle such as an automobile or motorcycle, has become general practice, particularly in cities. Rapid transport is expected, and above all, the dishes transported are expected to arrive in prime condition, hot and with all the characteristics of fragrance, taste and crispness they presented at the moment they were produced. In particular pizzas, being the product transported most frequently using motor vehicles, are most susceptible with respect to the fragrance and crispness problem: the increase in humidity softens them and deprives them of their fundamental product characteristics, i.e., mainly their fragrance. Thus humidity control during the transport of the product plays a decisive role in successful transport operations.

Today various proposals are known for solving this problem. For example, the simplest system practically applied is the insertion of the dishes to be transported into thermally insulated bags. This system is a low-cost operation but presents serious disadvantages due to the fast drop in temperature of the product causing a corresponding increase in humidity. The pizza delivered presents itself soggy and at the limit of fitness for consumption. Above all, this system presents severe hygienic problems, as cleaning of the bags is difficult, the bags easily becoming breeding grounds for dangerous bacteria. The same holds true for boxes and containers made from synthetic materials: they present the same disadvantages as the bags, differing in relevant part in that they are From the patent literature and from practical use technologically more advanced solutions of the problem are known, such as the solutions according to European Patent Publication No. EP-0481352A1 or European Patent Publication No. EP-0575471A1 (the invention also being shown in PCT International Publication No. WO92/16137).

In EP-0481352A1 an apparatus is shown for transporting and for keeping hot dishes in particular pizzas, where the container presents a lower portion and an upper portion, the lower portion being laid out as a functional part containing a fan and a heating device as well as a dehumidifying chamber. The fact that the apparatus requires a dehumidification chamber exemplifies a primary limitation of this system, namely, that the airflow in the chamber of the container is laid out in such a manner that dehumidification of the air with the help of a hygroscopic substance (such as, e.g., bran, which was cited as an example) is required. This solution is further problem-ridden, as its practical application dictates the use of a thermostat as well as of a hygrostat for controlling temperature and humidity of the air. Such arrangements render the layout of the apparatus complex and unsuitable for daily practical use.

EP-0575471A1, an equivalent of PCT-WO92/16137, shows a solution including an 1 apparatus for transporting, also known to be in practical use, namely a dish-heater with a gasoline burner. In the air circulation circuit inside the container, a heat exchanger is arranged in a separate chamber and laid out as a radiator or as an electrical heater or as a gasoline burner. An apparatus of this type is capable of maintaining the temperature inside the container over prolonged time periods, but does not solve the crucial problem of humidity control, and thus the quality of the product transported suffers. Furthermore the apparatuses of such type, of which the type with a gasoline burner is known best, all present a series of further disadvantages, such as elevated operating cost, higher noise level, danger of fire, hygiene problems, etc. Particularly disturbing is the fact that the hot air flow re-circulated inside the container is not filtered and thus carries harmful particles with it, which can be deposited onto the dishes in transport.

All these known systems, in which a heat exchanger receiving its heat energy in any specific manner (e.g., from the cooling system of the motor vehicle as described in EP-0628277A1 or also by analogy to the one shown in GB-2316739A using the exhaust fumes of the vehicle) is arranged in a separate chamber of the container for the actual dishes, are not preoccupied particularly with correct circulation of the hot air in the container nor with correct thermal insulation of the container, being limited to the provision of an insulated box in which shelves supporting the dishes are arranged. The humidity of the air thus cannot be controlled sufficiently and thus the dishes, in particular the pizzas, absorb too much humidity and go limp during transport.

SUMMARY OF THE INVENTION

The present invention provides for a device for keeping hot and for transporting dishes comprising a thermally insulated container in which the air circulation is laid out in such a manner that the above mentioned disadvantages of the devices known thus far are eliminated and that a stable temperature (of at least 130° C.) and perfect humidity control are ensured in the container, the most stringent hygiene standards being complied with.

Other exemplary embodiments and advantages of the present invention may be ascertained by reviewing the present disclosure and the accompanying drawings.

The overall layout of the container generally forms as a box or receptacle with walls comprising an air interspace for continually supplying fresh air from the outside into the inner chamber, which then is drained off continually via an exhaust opening provided in the bottom part of the container, and owing to this arrangement the air inside the box can circulate as freely as possibly—care having been taken that all unnecessary internal obstacles are eliminated—and constant ideal heating conditions for heating the dishes are obtained.

Of course this mode requires that sufficient heat is available, which implies that the heat exchanger provided must be able to supply the required heat energy. This can be effected using heat exchangers of all types, but the preferred solution is to employ the thermal energy of the exhaust fumes of the engine of the automobile as the heat source, but not in direct relation to dishes as described in the above mentioned GB-23 16739A. Swiss patent application No. 1999 1264/99, dated Jul. 9, 1999, describes a vehicle comprising an oven for dishes heated using the exhaust fumes of the engine of the vehicle.

According to another aspect of the invention, an apparatus is provided for keeping hot and for transporting prepared dishes from a producer to a consumer, using a motor vehicle equipped with a thermally insulated container. The container includes a lower portion supported by the motor vehicle in which a heat exchanger is provided. The container comprises a receptacle having a top, a bottom, a front and a rear, forming an inner chamber wherein the receptacle defines a through passage opening forming an air passage to ambient space. The receptacle further comprises a continuous wall having a double wall portion enclosing a continuous air interspace. This double wall portion defines an air inlet to permit ambient air to be drawn into the air interspace, and, defines an air outlet connected to the inner chamber of the receptacle to permit exhaust to ambient air. To move ambient air into the inner chamber, a blowing fan for directing ambient air into the air inlet is provided whereby the inner chamber is connected with the ambient air and continuous air flow is permitted to circulate through the inner chamber to be exhausted through the through passage opening located in the lower portion.

The receptacle also, of course, includes a door for permitting access to the inner chamber and shelves within the inner chamber for placement of the dishes. The shelves may be perforated or spaced from the receptacle wall within the inner chamber to form an air space, whereby free circulation of air within the inner chamber is maximized.

The door is preferably located at the front of the receptacle where the double wall portion defines the air outlet, thereby being proximate to the door and front, so that air stream vortices are maximized. To increase air intake into the double wall portion, at least two blowing fans may be attached to the continuous wall proximate to the top of the receptacle.

The double wall portion may comprise an external wall and an external top cover and an internal wall and internal top cover wherein the external wall and external top cover are made from wood and the internal wall and internal top cover are made from metal, preferably steel. In lieu of wood, the external wall and external top cover may be made of a material presenting thermal insulating characteristics similar to wood.

The motor vehicle on which the container is provided may include a combustion engine, an exhaust supply tube in communication with the combustion engine for exhausting combustion exhaust fumes, and an exhaust tube, wherein the heat exchanger is interposed between the exhaust supply tube and the exhaust tube. Typically, the through passage opening is located at the bottom of the receptacle and receives the exhaust supply tube and the exhaust tube from the motor vehicle. Thus, the heat exchanger is supplied with thermal energy from the exhaust fumes of the combustion engine of the motor vehicle when in operation. Also, the heat exchanger should comprise components for conducting and radiating heat to the inner chamber from a heat source supplied to the heat exchanger and air-impermeably separated from the inner chamber, thereby preventing the exhaust fumes from reaching the inner chamber, but allowing thermal exchange. Ideally, the heat exchanger is calibrated to maintain an air temperature in the inner chamber above 130° C. The container is thermally insulated so that the inner chamber maintains its temperature.

When the motor vehicle is a van with a load carrying compartment, the container may be sized to fit and mounted in such compartment. When the motor vehicle is a car with a trunk, the container is preferably sized to fit and be mounted therein. If the motor vehicle is a motorcycle, the motorcycle may have a luggage rack located behind a driver's seat for mounting the container. In some cases, the motor vehicle has reinforced points provided as anchoring points for seat belts; in such cases, the container may be secured to such reinforced points.

In many cases, the container may be well suited to these types of motor vehicles having a width ranging from approximately 50 cm to 100 cm, a depth ranging from approximately 40 to 60 cm, and a height ranging from approximately 30 cm to 70 cm. Particularly when dishes to be carried are pizzas, the receptacle ideally comprises a box, including lateral walls having dimensions which approximate a square.

The invention provides an apparatus for keeping hot and for transporting prepared dishes from a producer to a consumer, using a motor vehicle equipped with a container having a lower portion supported by the motor vehicle in which a heat exchanger is provided, wherein the motor vehicle includes a combustion engine, an exhaust supply tube in communication with the combustion engine for exhausting combustion exhaust fumes, an exhaust tube, and wherein the heat exchanger is interposed between the exhaust supply tube and the exhaust tube and thereby is supplied with thermal energy from the exhaust fumes of the combustion engine of the motor vehicle, the apparatus comprising a receptacle having a top, a bottom, a front and a rear, forming an inner chamber, the receptacle defining a through passage opening forming an air passage to ambient space wherein the through passage opening is located at the bottom of the receptacle and receives the exhaust supply tube and the exhaust tube. The receptacle further comprises a continuous wall having a double wall portion enclosing a continuous air interspace, the double wall portion defining an air inlet to permit ambient air to be drawn into the air interspace, and, defining an air outlet connected to the inner chamber proximate to the front, whereby air stream vortices are maximized, and wherein the double wall portion further comprises an external wall and an external top cover and an internal wall and internal top cover. The receptacle has a door for access to the inner chamber and located at the front, and, a perforated space from the wall within the inner chamber to form an air space, whereby free circulation of air within the inner chamber is maximized. The receptacle is provided with a blowing fan for directing ambient air into the air inlet, whereby the inner chamber is connected with the ambient air and continuous air flow is permitted to circulate through the inner chamber to be exhausted through the through passage opening located in the lower portion.

Further, according to another aspect of the invention, a method is disclosed of keeping hot and for transporting prepared dishes from a producer to a consumer using a motor vehicle having a combustion engine, an exhaust supply tube in communication with the combustion engine for exhausting combustion exhaust fumes, and an exhaust tube. The method comprises equipping the motor vehicle with a container having a lower portion supported by the motor vehicle in which a heat exchanger is provided. The container comprises a receptacle having a continuous wall defining an inner chamber, and a door for permitting access to the inner chamber, the wall having a double wall portion enclosing a continuous air interspace. The double wall portion defines an air inlet to permit ambient air from the motor vehicle to be drawn into the air interspace, and, defines an air outlet connected to the inner chamber. The receptacle forms a through passage opening between the container and the motor vehicle thereby forming an air passage to ambient space and passing the exhaust supply tube and the exhaust tube through the through passage opening. The method further comprises connecting the heat exchanger between the exhaust supply tube and the exhaust tube within the inner chamber, whereby thermal energy from the exhaust fumes of the combustion engine of the motor vehicle supplies heat to the heat exchanger and permits conductive and radiational heat exchange through the heat exchanger into the inner chamber. In this manner, the inner chamber is connected with the ambient air and continuous air flow is permitted to circulate through the inner chamber to be exhausted through the through passage opening. The method further comprises delivering the dishes by placing the dishes in the container and operating the motor vehicle.

The forms of preferred embodiments of the invention will be described in more detail with their advantages in the following description with reference to the illustrations in t FIG.

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein:

FIG. 2 shows in an enlarged, but still schematic view, the arrangement according to the FIG. 1 in a longitudinal section along a vertical plane parallel to the longitudinal axis of the automobile.

DETAILED DESCRIPTION OF THE PRESENT INVENTION

Figure 1:
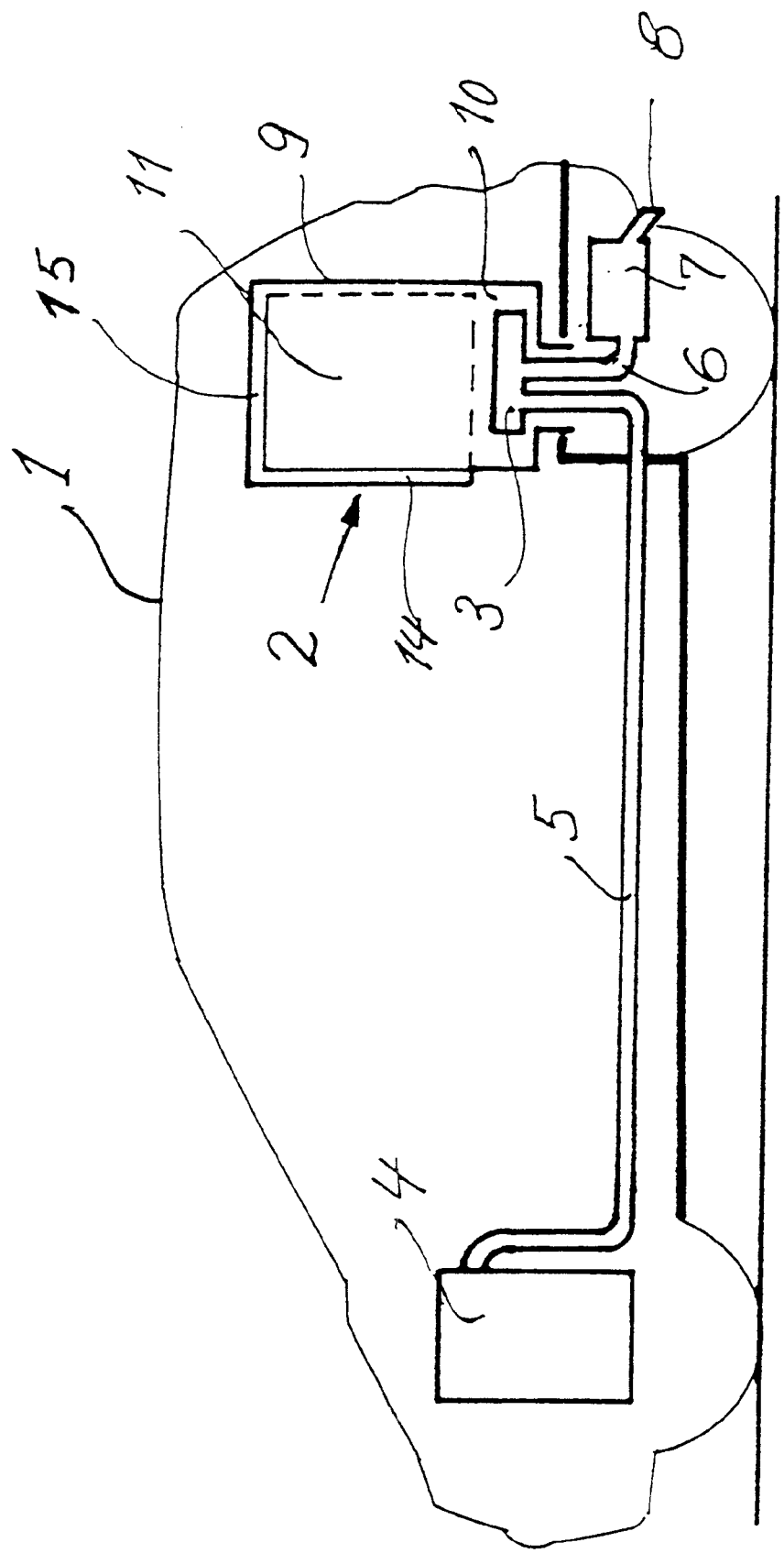
FIG. 1 shows a schematic representation of an automobile in which the inventive device is incorporated, for which arrangement the heat for operating the heat exchanger is supplied using thermal energy from the exhaust fumes of the engine.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In FIG. 1 a motor vehicle 1 is designated, which is chosen, in the sense of an example, to represent a van or delivery van. This type of vehicle in practical use proves to be ideal for incorporation of the inventive device, as the tail portion of the vehicle offers optimum space conditions and anchoring points for anchoring the box. Vehicles of such type as a rule are equipped with reinforced points required for anchoring the inventive device, namely the anchoring points for the seat belts, the supports of the back seats, and of reinforcing cross-members, etc.; all these arrangements are not shown in FIG. 1 as any specialist in the field knows these aspects. Selection of a van type vehicle, however, is not to be interpreted in the sense of a limitation: the inventive device (which in the following is referred to as "dish heater" for the sake of brevity) can be mounted on practically any type of motor vehicle, i.e. on vehicles with four, three or two wheels, and thus also on motorcycles, just as illustrated already in the non-published Swiss patent application No. 1999 1264/99. In this context it is only important that the motor vehicle offers sufficient space to accommodate the dish heater and that it can be anchored solidly (using screws, clamps, etc.).

In the tail portion of the motor vehicle 1 the inventive device for keeping hot and for transporting dishes is arranged at about the zone of the rear wheels, or the back seats respectively, the device comprising a thermally insulated container 2 in the bottom portion of which a heat exchanger 3 is arranged. The heat exchanger 3 is supplied with heat from an external source (which can be formed by a radiator cooling the engine of the motor vehicle, by an electric resistance heater supplied with current from the car battery, by a separate gasoline burner as shown e.g. in PCT/WO92/16137). As indicated schematically in FIG. 1, and as provided according to a preferred form of realization of the present invention, exhaust fumes of the engine 4 are supplied to the heat exchanger 3 via the tube 5 and exhausted via the tube 6 to the muffler and to the exhaust pipe 8. In other embodiments, the external heat source merely must present sufficient thermal capacity in relation to the size of the container and thus of the volume of dishes to be transported. The heat exchanger thus must be capable to supply a sufficient heat energy quantity to the inside of the container for ensuring a constant temperature of at least 130° C. inside the container. The type and the capacity of the heat exchanger 3 are determined based on the practical experience of the specialist in the field. Here it is to be mentioned merely that the selection of a heat exchanger supplied with the heat content of the exhaust fumes of a vehicle with an internal combustion engine (be it an automobile or a motorcycle) has proven ideal as it permits utilization of an abundant source of heat, which is practically free of charge, as the exhaust fumes of a combustion engine as a rule escape to the surrounding atmosphere, which is heated thereby. Experience has proven that utilization of the exhaust fumes of a combustion engine for heating an inventive device (dish heater) permits improvements in engine performance, on the condition, however, that the heat exchanger meets certain design criteria, which are not to be discussed here as they do not concern the substance of the present invention. It is to be noted, however, that within the scope of the present invention the sole limitation concerning the heat exchanger 3 is that it is required to present sufficient thermal capacity, to be determined from case to case in function of the volume of the container 2, of the quantity of dishes to be transported, and of the duration of the transport runs, etc.

It is of great importance, however, to stress that the heat must be transmitted to the air contained in the container 2 by simple heat conduction and heat radiation: absolutely no exchange between the medium supplying the heat (gas, air, water, or other media) and the air within the container is to take place, in order to prevent any deterioration of the food product to be transported.

The container 2 now must meet certain precisely set conditions for realising the present invention.

The container is formed as a receptacle or box 9 of essentially square shape, at the bottom 10 of which the heat exchanger 3 is incorporated. The term bottom 10 in this context is not necessarily to be understood as a closed surface, but rather as the bottom portion of the box 9 (referred to as receptacle 9 also), which can be separated from the inside room of the box 9, also called inner chamber 11, by a perforated plate 12 which is open along all its edges.

One of the four lateral walls of the box 9 is to be linked to the box 9, e.g. at the bottom portion 10, in such a manner that it forms a sealing access door 13 of the container 2. In order to ensure reliable sealing action, the access door 13, or the closing cover respectively, of the container 2 can be provided with a suitable elastic and heat resistant seal. The other three lateral walls (one of which only is visible in FIGS. 1 and 2, namely the back wall 14 opposite the access door 13) and the top side wall 15 of the box 9 are laid out as double walls, which within them enclose an air space 16, 17 as seen in FIG. 2. These air interspaces 16, 17 (of which two only of the four are visible in the FIG. 2) are all mutually interconnected laterally and up front, at the access door 13, and are connected to and in communication with the internal chamber 11 of the container 2. Between the air interspace 16, 17 and the internal chamber 11 of the container 2 thus a continuous air exchange can form, which is reinforced further, as will be explained in the following, by the action of a blowing fan 18, which preferably is arranged in the vertical back wall 14.

Furthermore, the inner chamber 11 of the container 11 is connected with the ambient air via a through passage opening 19 located in the lower part 20 of the bottom 10 of the container 2.

Providing intermediate air spaces 16, 17, connections to the inner chamber 11, air outlet passage opening 19, and at least one blower fan 18 is aimed at the purpose, fundamental for the present invention in order to achieve the results desired, of establishing a circulating air movement inside the chamber 11, in the sense of vortices circulating about horizontal axes. Within the container 2 an air stream is created, which passes from the air interspaces 16, 17 to the inner chamber 11 via the connection at the access door 13, and which escapes via the outlet passage 19 located at the bottom of the container 2. In order to ensure that the formation of the rotating air stream in the chamber 11 is not prevented by the presence of closed separations, care is taken that the shelves 21 supporting the dishes (as well as the support 12) are made in such a manner that the air can circulate as freely as possible: these shelves 12, 21, as indicated in FIG. 2, e.g., do not extend to, and do not contact, the internal walls of the inner chamber 11, rather, between the shelves 12, 21 and the walls abundant space is left free. Furthermore, according to a preferred embodiment of the present invention, the supporting shelves are made from perforated sheet metal (see FIG. 2).

In FIG. 2 a support plane, designated 23, is indicated, which is mounted, using screws 25, and 25' respectively, to the plate 24, which is part of the body of the vehicle. These fastening elements may differ from vehicle type to vehicle type, i.e. these elements will likely have to be adapted to every different type vehicle on which the inventive device is to be mounted (be it an automobile or a motorcycle). For this purpose the specialist in the field will have to choose, possibly in cooperation with the manufacturer of the vehicle, the anchoring points best suited for fastening the inventive device. In the ideal case the vehicle can be equipped in series production already with particular anchoring points for the inventive device, which arrangement renders incorporation of the inventive device less expensive. According to a preferred form of realization of the present invention the outer lateral walls 26 (one only of the three being shown) and of the top cover 27 of the box 9 are made from wood or of a material similar to wood, whereas the internal walls 28, 29 forming the air interspace are made from metal, and preferentially from steel.

This systematic supply of fresh air from the outside under the influence of the fan 18, the continual supply of heat by the heat exchanger 3, the formation of air vortices inside the inner chamber 11, indicated in the FIG. 2 by the arrows f, are the basis of the advantages of the inventive device. The dishes transported on the shelves 12, 21 of a device of this type remain hot and crisp also after hours of transport, as if they had just been taken from the oven, owing to the fact, that at all times sufficient amounts of heat are supplied to the box 9 forming the container, which is provided with good thermal insulation and is laid out in such a manner that said air circulation inside the container is ensured. These objectives are achieved with the design characteristics described of the container 2.

Application of wood or similar materials in the outer walls 26, 27 of the box 9 (including the access door 13) has proven optimal for heat insulation towards the outside, combining with this characteristic also the advantages of low cost and of aesthetically excellent looks.

According to another embodiment of the present invention, which is not illustrated in the Figures, at least two blowing fans 18 are provided in the vertical back wall 14 of the box 9 arranged symmetrically with respect to a median vertical plane of the box 9 in the upper part of wall 14. At least two blowing fans 18 establish better circulation of the air stream inside the box 9 by ensuring better symmetry of the air stream over the whole width of the box. This is of particular importance if boxes 9 of a width of 80 cm or more, as convenient for the inventive containers 2, are to be installed at a bias in the load compartment or the trunk of an automobile.

The container 2 is mounted using screws 25, 25', which fasten it to a plane 23, or to the lower wall 24 of the body shell of the motor vehicle.

According to another embodiment of the present invention, the anchoring points are reinforced points normally provided in the vehicle either as anchoring points for the seat belts, the support points for the back seats, or for reinforcing cross members of the body shell of the According to another embodiment of the present invention, the passage through opening 19, located at the bottom 20 of the container 2, also serves as a passageway for the supply tube 30 and the exhaust tube 31 for the heating medium of the heat exchanger 3. Owing to this arrangement unnecessary openings extending through the bottom 20 of the container 2 are avoided, and the tubes 30 and 31 are free to perform small movements relative to the container 2. This solution is particularly useful if the tubes 30 and 31 are part of the exhaust pipe arrangement of the automobile, which always is supported separate from the body of the vehicle.

According to another embodiment of the present invention, the external dimensions of the container 2 are chosen ranging between the following limit values: width between 50 cm and 100 cm, depth between 40 cm and 60 cm, and height between 30 cm and 70 cm. Within these limits containers can be realized, which are suitable for automobiles and delivery vans as well as motorcycles, which take into account the practical application of the transport operations, e.g., calling for great quantities of prepared dishes to be transported in one trip, accommodated by the capacity of the inventive device, as well as the difficult traffic conditions in large urban agglomerations, which rather call for application of smaller vehicles such as motorcycles with two or three wheels. The choice of the most suitable vehicle in which the inventive device is to be incorporated, and thus also the choice of the dimensions of the container 2 in many instances depends on a compromise to be found between transport capacity of the motor vehicle and the local traffic to be coped with. Owing to the characteristics of the present invention transport capacity of the containers 2 that can be realized is not limited for practical purposes; all that is required is a sufficiently strong source of energy for supplying the heat exchanger 3. The most suitable choice thus rather depends on the operation mode intended for such containers, i.e., on the transport conditions to be expected. The present invention puts the user into the best position for selecting the optimum solution without pre-requirements as to the type of transport and/or the length of the runs to be performed, as owing to the inventive device the prepared dishes transported, and in particular the most susceptible pizzas, remain unaltered with respect to their quality over hour-long periods.

The inner chamber 11 under the influence of blowing fan 18 will be kept free of a danger that carbon monoxide collects inside the vehicle even in the most unlikely case that the heat exchanger 3, being operated using the exhaust fumes of the motor vehicle, should leak. In the same manner the increased pressure in the inner chamber 11, however limited, expressed in Bar, optimally ensures that any undesirable odors emanating from the prepared dishes in transport as well as any contaminating agents such as germs and bacteria are eliminated.

The present invention concerns a device for keeping hot and for transporting prepared dishes, in particular pizzas, using a motor vehicle. The inventive device comprises a container 2 formed essentially as a square box 9 in the bottom part 20 of which a heat exchanger 3 is incorporated. One of the lateral walls of the box 9 is laid out as an access door 13, whereas the other lateral walls 14 and the top cover 15 are double walls enclosing an air interspace 16 within which an air stream is generated using a blowing fan 18.

The air stream is laid out in such a manner that inside the inner chamber 11 an air circulation is established as a vortex extending throughout the whole chamber 11 and escaping via a through passage opening 19 at the bottom. Owing to the free air circulation within the inner chamber 11, and to the supply of sufficient heat energy, the temperature inside the chamber 11 is maintained always above 130° C., and the humidity generated by the dishes is kept under control continually, in such a manner that the dishes are maintained hot and crisp, even if transport takes several hours.

The heat exchanger 3 preferentially is supplied with the exhaust fumes of the combustion engine 4 of the motor vehicle.

Application of wood or similar materials in the outer walls 26, 27 of the box 9 (including the access door 13) has proven optimal for heat insulation towards the outside, combining with this characteristic also the advantages of low cost and of aesthetically excellent looks.

According to another embodiment of the present invention, which is not illustrated in the Figures, at least two blowing fans 18 are provided in the vertical back wall 14 of the box 9 arranged symmetrically with respect to a median vertical plane of the box 9 in the upper part of wall 14. At least two blowing fans 18 establish better circulation of the air stream inside the box 9 by ensuring better symmetry of the air stream over the whole width of the box. This is of particular importance if boxes 9 of a width of 80 cm or more, as convenient for the inventive containers 2, are to be installed at a bias in the load compartment or the trunk of an automobile.

The container 2 is mounted using screws 25, 25', which fasten it to a plane 23, or to the lower wall 24 of the body shell of the motor vehicle.

According to another embodiment of the present invention, the anchoring points are reinforced points normally provided in the vehicle either as anchoring points for the seat belts, the support points for the back seats, or for reinforcing cross members of the body shell of the According to another embodiment of the present invention, the passage through opening 19, located at the bottom 20 of the container 2, also serves as a passageway for the supply tube 30 and the exhaust tube 31 for the heating medium of the heat exchanger 3. Owing to this arrangement unnecessary openings extending through the bottom 20 of the container 2 are avoided, and the tubes 30 and 31 are free to perform small movements relative to the container 2. This solution is particularly useful if the tubes 30 and 31 are part of the exhaust pipe arrangement of the automobile, which always is supported separate from the body of the vehicle.

According to another embodiment of the present invention, the external dimensions of the container 2 are chosen ranging between the following limit values: width between 50 cm and 100 cm, depth between 40 cm and 60 cm, and height between 30 cm and 70 cm. Within these limits containers can be realized, which are suitable for automobiles and delivery vans as well as motorcycles, which take into account the practical application of the transport operations, e.g., calling for great quantities of prepared dishes to be transported in one trip, accommodated by the capacity of the inventive device, as well as the difficult traffic conditions in large urban agglomerations, which rather call for application of smaller vehicles such as motorcycles with two or three wheels. The choice of the most suitable vehicle in which the inventive device is to be incorporated, and thus also the choice of the dimensions of the container 2 in many instances depends on a compromise to be found between transport capacity of the motor vehicle and the local traffic to be coped with. Owing to the characteristics of the present invention transport capacity of the containers 2 that can be realized is not limited for practical purposes; all that is required is a sufficiently strong source of energy for supplying the heat exchanger 3. The most suitable choice thus rather depends on the operation mode intended for such containers, i.e., on the transport conditions to be expected. The present invention puts the user into the best position for selecting the optimum solution without pre-requirements as to the type of transport and/or the length of the runs to be performed, as owing to the inventive device the prepared dishes transported, and in particular the most susceptible pizzas, remain unaltered with respect to their quality over hour-long periods.

The inner chamber 11 under the influence of blowing fan 18 will be kept free of a danger that carbon monoxide collects inside the vehicle even in the most unlikely case that the heat exchanger 3, being operated using the exhaust fumes of the motor vehicle, should leak. In the same manner the increased pressure in the inner chamber 11, however limited, expressed in Bar, optimally ensures that any undesirable odors emanating from the prepared dishes in transport as well as any contaminating agents such as germs and bacteria are eliminated.

The present invention concerns a device for keeping hot and for transporting prepared dishes, in particular pizzas, using a motor vehicle. The inventive device comprises a container 2 formed essentially as a square box 9 in the bottom part 20 of which a heat exchanger 3 is incorporated. One of the lateral walls of the box 9 is laid out as an access door 13, whereas the other lateral walls 14 and the top cover 15 are double walls enclosing an air interspace 16 within which an air stream is generated using a blowing fan 18.

The air stream is laid out in such a manner that inside the inner chamber 11 an air circulation is established as a vortex extending throughout the whole chamber 11 and escaping via a through passage opening 19 at the bottom. Owing to the free air circulation within the inner chamber 11, and to the supply of sufficient heat energy, the temperature inside the chamber 11 is maintained always above 130° C., and the humidity generated by the dishes is kept under control continually, in such a manner that the dishes are maintained hot and crisp, even if transport takes several hours.

The heat exchanger 3 preferentially is supplied with the exhaust fumes of the combustion engine 4 of the motor vehicle.

The inventive device is laid out for installation in a car, or in a delivery van, as well as on a motorcycle.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

List of Elements Referred to in the Figures 1 motor vehicle
2 container
3 heat exchanger
4 combustion engine
5 supply tube
6 exhaust tube
7 muffler
8 exhaust pipe
9 box or receptacle
10 bottom
11 inner chamber
12 perforated shelf
13 access door
14 back wall
15 top cover
16 air interspace
17 air interspace
18 blowing fan
19 through passage opening
20 lower part of the bottom
21 shelves
23 support plane
24 plate
25, 25' screws
26 external lateral walls
27 external top cover
28 internal wall
29 internal wall
30 supply tube
31 exhaust tube

What is claimed is:

1. An apparatus for keeping hot and for transporting prepare dishes from a to a consumer, using a motor vehicle equipped with a container having a lower portion supported by the motor vehicle in which a heat exchanger is provided, the apparatus comprising:
   a receptacle having a top, a bottom, a front and a rear, forming an inner chamber;
   the receptacle defining a through passage opening forming an air passage to ambient space;
   the receptacle further comprising a continuous wall having a double wall portion enclosing a continuous air interspace;
   the double wall portion defining an air inlet to permit ambient air to be drawn into the air interspace, and, defining an air outlet connected to the inner chamber of the receptacle;
   a door for permitting access to the inner chamber; and
   a blowing fan for directing ambient air into the air inlet, whereby the inner chamber is connected with the ambient air and continuous air flow is permitted to circulate through the inner chamber to be exhausted through the through passage opening located in the lower portion.

2. The apparatus according to the claim 1, further comprising shelves within the inner chamber.

3. The apparatus according to the claim 2, wherein the shelves are perforated.

4. The apparatus according to the claim 2, wherein the shelves are spaced from the wall within the inner chamber to form an air space, whereby free circulation of air within the inner chamber is maximized.

5. The apparatus according to the claim 1, wherein the door is located at the front of the receptacle and the double wall portion defines the air outlet proximate to the door and front, whereby air stream vortices are maximized.

6. The apparatus according to the claim 1, wherein the double wall portion further comprises:
   an external wall and an external top cover; and
   an internal wall and internal top cover;
   wherein the external wall and external top cover are made from wood and the internal wall and internal top cover are made from metal.

7. The apparatus according to claim 6 wherein the metal is steel.

8. The apparatus according to claim 6, wherein the external wall and external top cover are made of a material presenting thermal insulating characteristics similar to wood.

9. The apparatus according to the claim 1, wherein the motor vehicle comprises:
   a combustion engine;
   an exhaust supply tube in communication with the combustion engine for exhausting combustion exhaust fumes;
   an exhaust tube; and
   wherein the heat exchanger is interposed between the exhaust supply tube and the exhaust tube and thereby is supplied with thermal energy from the exhaust fumes of the combustion engine of the motor vehicle.

10. The apparatus according to the claim 9, wherein the through passage opening is located at the bottom of the receptacle and receives the exhaust supply tube and the exhaust tube.

11. The apparatus according to claim 1, wherein the heat exchanger is calibrated to maintain an air temperature in the inner chamber above 130° C.

12. The apparatus according to the claim 1, wherein the motor vehicle is a van with a load carrying compartment in which the container is mounted.

13. The apparatus according to claim 1, wherein the motor vehicle is a car with a trunk in which the container is mounted.

14. The apparatus according to claim 1, wherein the motor vehicle is a motorcycle having a luggage rack located behind a driver's seat.

15. The apparatus according to claim 1, comprising at least two blowing fans.

16. The apparatus according to claim 15, wherein the at least two blowing fans are attached to the continuous wall proximate to the top of the receptacle.

17. The apparatus according to claim 1, wherein the motor vehicle has reinforced points provided as anchoring points for seat belts and the container is secured to the reinforced points.

18. The apparatus according to claim 1 wherein the container has a width ranging from approximately 50 cm to 100 cm, a depth ranging from approximately 40 cm to 60 cm, and a height ranging from approximately 30 cm to 70 cm.

19. The apparatus according to claim 1 wherein the receptacle comprises a box.

20. The apparatus according to claim 19 wherein the box includes lateral walls having dimensions which approximate a square.

21. The apparatus according to claim 1 wherein the dishes are pizzas.

22. The apparatus according to claim 1 wherein the container is thermally insulated.

23. The apparatus according to claim 1 wherein the heat exchanger comprises components for conducting and radiating heat to the inner chamber from a heat source supplied to the heat exchanger and air-impermeably separated from the inner chamber.

24. An apparatus for keeping hot and for transporting prepared dishes from a producer to a consumer, using a motor vehicle equipped with a container having a lower portion supported by the motor vehicle in which a heat exchanger is provided, wherein the motor vehicle includes a combustion engine, an exhaust supply tube in communication with the combustion engine for exhausting combustion exhaust fumes, an exhaust tube, and wherein the heat exchanger is interposed between the exhaust supply tube and the exhaust tube and thereby is supplied with thermal energy from the exhaust fumes of the combustion engine of the motor vehicle, the apparatus comprising:

a receptacle having a top, a bottom, a front and a rear, forming an inner chamber;

said receptacle defining a through passage opening forming an air passage to ambient space wherein the through passage opening is located at the bottom of the receptacle and receives the exhaust supply tube and the exhaust tube;

the receptacle further comprising a continuous wall having a double wall portion enclosing a continuous air interspace, the double wall portion defining an air inlet to permit ambient air to be drawn into the air interspace, and, defining an air outlet connected to the inner chamber proximate to the front, whereby air stream vortices are maximized, and wherein the double wall portion further comprises an external wall and an external top cover and an internal wall and internal top cover;

a door for access to the inner chamber and located at the front;

a perforated shelf spaced from the wall within the inner chamber to form an air space, whereby free circulation of air within the inner chamber is maximized, and a blowing fan for directing ambient air into the air inlet, whereby the inner chamber is connected with the ambient air and continuous air flow is permitted to circulate through the inner chamber to be exhausted through the through passage opening located in the lower portion.

25. A method of keeping hot and for transporting prepared dishes from a producer to a consumer using a motor vehicle having a combustion engine, an exhaust supply tube in communication with the combustion engine for exhausting combustion exhaust fumes, and an exhaust tube, comprising:

equipping the motor vehicle with a container having a lower portion supported by the motor vehicle in which a heat exchanger is provided, the container comprising a receptacle having a continuous wall defining an inner chamber, and a door for permitting access to the inner chamber, the wall having a double wall portion enclosing a continuous air interspace, the double wall portion defining an air inlet to permit ambient air from the motor vehicle to be drawn into the air interspace, and, defining an air outlet connected to the inner chamber, forming a through passage opening between the container and the motor vehicle thereby forming an air passage to ambient space and passing the exhaust supply tube and the exhaust tube through the through passage opening; and connecting the heat exchanger between the exhaust supply tube and the exhaust tube within the inner chamber, whereby thermal energy from the exhaust fumes of the combustion engine of the motor vehicle supplies heat to the heat exchanger and permits conductive and radiational heat exchange through the heat exchanger into the inner chamber and whereby the inner chamber is connected with the ambient air and continuous air flow is permitted to circulate through the inner chamber to be exhausted through the through passage opening.

26. The method according to claim 25, further comprising delivering the dishes by placing the dishes in the container and operating the motor vehicle.

* * * * *